Jan. 3, 1961 N. R. SCHWARTZ 2,966,998
LIGHTING FIXTURE SUPPORT PLATE
Filed April 11, 1958
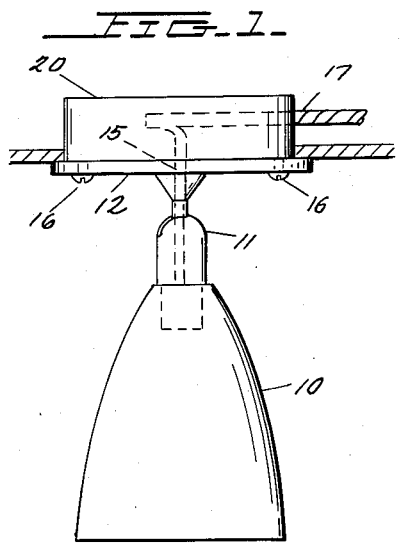
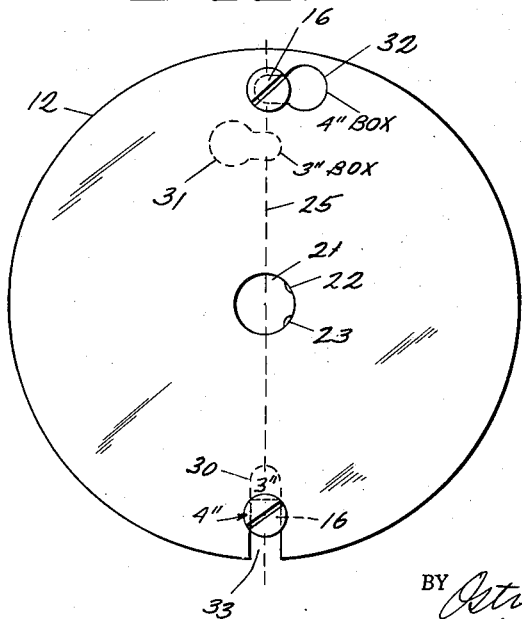
INVENTOR.
NATHAN R. SCHWARTZ
BY
ATTORNEYS

United States Patent Office 2,966,998
Patented Jan. 3, 1961

2,966,998
LIGHTING FIXTURE SUPPORT PLATE

Nathan R. Schwartz, Yonkers, N.Y., assignor to Naras Research Inc., New York, N.Y., a corporation of New York Filed Apr. 11, 1958, Ser. No. 727,869

2 Claims. (Cl. 220—3.8)

This invention relates to a device adapted to secure electrical fixtures to electrical connection boxes of varying size, and, more particularly, to a plate-like member for securing electrical lighting fixtures to a box which is located on a supporting surface such as a wall, ceiling or the like.

In securing electrical fixtures to a connection box located either on or within a supporting surface it has heretofore been necessary to provide separate means for supporting such fixtures depending upon the size of the connection box.

In accordance with the present invention, a simple plate-like device has been found which, when provided with knock-out sections of a predetermined configuration and location, will allow an electrical fixture, such as a lighting device, to be readily secured to boxes of varying size.

Accordingly, it is an object of the present invention to provide a device which is adapted for securing electrical fixtures to connection boxes of varying size.

Another object of the present invention is to provide a simple plate-like member which will readily receive a lighting fixture and the electrical wiring therein and, at the same time, provide means for securing said lighting fixture to connection boxes of varying sizes.

These and other objects of the present invention will become more apparent when taken in connection with the following description and the drawings in which:

Figure 1 is a sectional view showing a typical lighting fixture as it would be secured to a wall or ceiling utilizing the plate-like member of the present invention.

Figure 2 illustrates the plate-like member by itself, showing in a preferred embodiment, how the various knock-out sections thereof may be arranged in order to accommodate different size electrical connection boxes.

Essentially the present invention involves a device for securing electrical fixtures to connection boxes of varying size, the said device comprising a plate-like member having a central opening for the passage of electrical wiring therethrough and for the securing of the electrical fixture thereto. The plate is so designed that along a single diameter thereof there are located a plurality of knock-out sections, which when opened or knocked out by a suitable tool, provide for the passage of fastening means, which then connect the plate to the box.

One of the knock-out sections is designed to extend radially along one radius of the common diameter on which all of the knock-outs are located. This radially extending section terminates in a slotted opening which extends to the circumferential edge of the plate. The other knock-out sections are located on the other radius of the aforesaid common diameter line. These sections generally extend in a direction normal to the said radius and are of a keyed shape, including a narrow elongated section aligned along the common radius and a larger circular-like section displaced from the said radius.

The fastening screws or other fastening means may then initially be passed through the larger section of one of these knock-outs and, as the plate is aligned, the shank of the screw will fit within the narrow section of the knock-out which is then radially aligned with the aforesaid radially extended knock-out section.

Referring now to the drawings, and to the invention in more detail it is seen in Figure 1 that a lighting fixture 10 supported by a suitable swivel joint 11 is secured to a wall or ceiling by means of a nipple 15 which also acts as a conduit for the electrical wiring and which is externally threaded where it engaged the plate 12. The plate 12 which is designed in accordance with the present invention is then secured by means of screw member 16 to an electrical connection box 20. Such boxes, which are well known, may include wire terminals or other wire connections, the wires extending into the same in a predetermined fashion. The internal wiring within the wall or ceiling is indicated as 17.

In Fig. 2 the plate member 12 is illustrated in detail as it would appear when connected to a four inch box. The specific embodiment herein illustrated shows a plate member adaptable to connect to either a three inch or four inch box, but it should be understood that, following the teachings of this invention, the plate could be designed to accommodate more than two sizes of boxes or two boxes of any predetermined size.

The plate 12 contains a central opening 21 which is keyed at 22 and 23 so that the externally threaded nipple 15 extending from the lighting fixture can be locked into place and will not rotate freely. Along a common diameter illustrated by dotted line 25 there is located knock-outs 30, 31 and 32, the latter being shown as being completely knocked out. The knock-out member 30 extends in a generally radial direction and terminates in an elongated slot 33 extending to the outer circumference of the plate.

When it is desired to connect the fixture to a four inch or larger box the section 30 is not knocked out and the screw 16 abuts the outer edge of section 30. In this position, it is aligned with a threaded hole within the connection box. In case a smaller box is used, illustrated as a three inch size, the section 30 is punched out by a suitable tool and the screw 16 then fits into the corresponding hole of the smaller box.

A similar arrangement applies with respect to knock-out sections 31 and 32. When a larger four inch box is utilized the section 32 is completely punched out, as illustrated, and the screw 16 therein now fits into the threaded hole located in the connection box. The knock-out 31 remains intact. The reverse is true should the installer find that only a three inch box is available.

Thus, in accordance with the present invention a lighting fixture can be secured to a wall or ceiling provided with electrical connection boxes of varying size by means of a single universal plate. There is no need to provide a different type of connecting means when different size boxes are encountered, as is often the case in building installations.

The keyed shape of knock-outs 31 and 32 is provided so that the screw may be readily inserted into the larger portion thereof after the other screw is connected to the box. Once the threaded hole in the box is located, the plate may be rotated slightly and the screw then slides into the narrow key-way and aligns itself diametrically with the screw on the other radius of the plate.

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appending claims.

I claim:

1. A device adapted for securing electrical fixtures to electrical connection boxes of varying size, comprising a plate member having a central opening for the passage of electrical wiring therethrough, and having, along a single diameter thereof, a plurality of knock-out sections which, when open, provide for the passage fastening means therethrough; one of said knock-out sections extending radially along one radius of said diameter and terminating in a slotted opening which extends to the circumferential edge of the plate; the other of said knock-out section extending in a direction normal to the other radius of the said diameter and having a keyhole shape including a narrow section extending transversely across the said radius and a larger section displaced from the said radius, said narrow section of the knock-out being adapted to receive the fastening means upon securing of the plate to the electrical connection box.

2. A device adapted for securing electrical lighting fixtures to electrical connection boxes of varying size, comprising a plate member having a central opening for the passage of electrical wiring therethrough, and having, along a single diameter thereof, a plurality of knock-out sections which, when open, provide for the passage of screw fastening means therethrough; one of said knock-out sections extending radially along one radius of the said diameter and terminating in a slotted opening which extends to the circumferential edge of the plate; the other of said knock-out sections extending in a direction normal to the other radius of the said diameter and having a key hole shape including a narrow section extending transversely across the said radius and a larger section displaced from the said radius, said narrow section of the knock-out being adapted to receive the shank of the screw fastening means upon securing of the plate to the electrical connection box.

References Cited in the file of this patent

UNITED STATES PATENTS

| | | |
|---|---|---|
| 1,950,523 | Severn | Mar. 13, 1934 |
| 2,161,492 | Wadsworth | June 6, 1939 |
| 2,321,640 | Adkins | June 15, 1943 |
| 2,596,236 | Glosier | May 13, 1952 |